(12) United States Patent
Ferstl et al.

(10) Patent No.: US 7,185,046 B2
(45) Date of Patent: Feb. 27, 2007

(54) SUBMITTING JOBS IN A DISTRIBUTED COMPUTING ENVIRONMENT

(75) Inventors: Friedrich F. X. Ferstl, Maxhutte-Haidhof (DE); Andreas U. J. Haas, Regensburg (DE); Shannon V. Davidson, Hillsboro, MO (US)

(73) Assignee: Sun Microsystems, Inc., Santa Clara, CA (US)

( * ) Notice: Subject to any disclaimer, the term of this patent is extended or adjusted under 35 U.S.C. 154(b) by 768 days.

(21) Appl. No.: 10/230,635

(22) Filed: Aug. 28, 2002

(65) Prior Publication Data

US 2004/0044718 A1  Mar. 4, 2004

(51) Int. Cl.
G06F 15/16 (2006.01)
(52) U.S. Cl. ...................................................... 709/201
(58) Field of Classification Search ................ 709/203, 709/224, 226
See application file for complete search history.

(56) References Cited

U.S. PATENT DOCUMENTS

| | | | |
|---|---|---|---|
| 6,182,139 B1* | 1/2001 | Brendel | 709/226 |
| 6,865,601 B1* | 3/2005 | Cherkasova et al. | 709/220 |
| 6,928,477 B1* | 8/2005 | Leymann et al. | 709/226 |
| 6,965,930 B1* | 11/2005 | Arrowood et al. | 709/223 |
| 2003/0014524 A1* | 1/2003 | Tormasov | 709/226 |
| 2003/0233602 A1* | 12/2003 | Lindquist et al. | 714/47 |
| 2004/0003077 A1* | 1/2004 | Bantz et al. | 709/224 |

OTHER PUBLICATIONS

Yun Huang, Nalini Venkatasubramanian, "QoS-based Resource Discovery in Intermittently Available Environments", Jul. 23-26, 2002, IEEEXplore, pp. 50-59.*
Pazel et al., "Neptune: A Dynamic Resource Allocation and Planning System for a Cluster Computing Utility", May 21-24, 2002, IEEEXplore, pp. 57-64.*
Arora et al., "A De-centralized Scheduling and Load Balancing Algorithm for Heterogeneous Grid Environments", Aug. 18-21, 2002, IEEEXplore, pp. 499-505.*

* cited by examiner

Primary Examiner—Jason Cardone
Assistant Examiner—Minh-Chau N. Nguyen
(74) Attorney, Agent, or Firm—Park, Vaughan & Fleming, LLP

(57) ABSTRACT

Method and system for submitting computing jobs in a distributed computing environment including receiving a job request with an instruction to execute a computing job, selecting a job handler for handling the computing job based on selection information and submitting the computing job to the selected job handler. The invention can be embodied in a client unit, thus providing a decentralized distribution of computing jobs and avoiding bottlenecks in the distribution of computing jobs for example in a computing grid.

37 Claims, 6 Drawing Sheets

SUBMITTING JOBS IN A DISTRIBUTED COMPUTING ENVIRONMENT

FIELD OF THE INVENTION

The invention relates to a client, system and method for submitting computing jobs in a distributed computing environment.

BACKGROUND OF THE INVENTION

Computing devices are commonplace in a growing number of fields. For example, computing devices are now generally employed to provide services in office environments, research, engineering and development environments, scientific environments and private environments. Services range from simple data handling operations to most complex scientific, research, engineering and development or other applications requiring extensive computing resources.

With increasing computing capabilities more complex applications may be handled by a single computing device. However, within limits, applications or programs may become so complex that it is not economical or possible within a reasonable time frame to handle the amount of data or computations required to solve a computing problem with a single computing device. A straight forward solution to handle evermore complex applications is to construct larger computing devices, for example with multiple processors for increased computing speed or with larger memories for improved data access and handling. However, computing devices are generally not arbitrarily scaleable and most importantly, not at reasonable costs.

Parallel to the availability of computing devices with increased processing capabilities more and more networks interconnecting large numbers of computing devices emerge.

For example, local area networks such as company-wide networks interconnect computing devices of a company, or wide area network such as the Internet connecting computing devices virtually all over the world. These networks are increasingly used and have dramatically improved in the recent past. Improved communication schemes allow a more efficient communication and collaboration between computing devices interconnected over a computer network.

Thus, as an alternative to constructing a larger stand-alone computing device, as outlined above, for example with a larger number of processors, a plural number of computing devices may be used to solve a single computing task, also termed computing job. Such an interconnection of a plurality of computing devices over a computing network may be termed computing grid or data grid. A computing grid is a hardware and software infrastructure serving to handle computing jobs submitted by a user. The computing grid may interconnect distributed computers, storage devices, mobile devices, instruments, sensors, data bases and/or software applications. Generally a computing grid may comprise virtually any kind of computing device and includes a grid infrastructure to handle the distribution of computing jobs.

A system for handling computing jobs in a computing grid is described in "Sun grid engine 5.3 administration and users' guide", Sun Microsystems, Inc. part no. 816-2077-11, April 2002, revision 01. This document describes a grid with a central grid infrastructure for handling the distribution of computing jobs in the computing grid. Upon receiving an instruction to distribute a computing job the grid infrastructure selects a suitable computing device and transfers the computing job to the selected computing device. The computing device then performs the computational operations necessary and returns the computational results to the source of the computing job. Accordingly, a user or application at a client device may issue an instruction to execute a computing job towards the grid infrastructure which in turn selects a suitable processing element and the processing results are ultimately returned to the client.

The above computing grid with a central grid infrastructure centralizes all intelligence for distributing computing jobs. However, this leads to a potential bottleneck in case of a very large number of computing jobs to be handled, as all computing jobs need to be distributed by the grid infrastructure.

Accordingly, a computing grid with a centralized grid infrastructure may not always be able to handle all computing jobs submitted in a computing grid.

SUMMARY OF THE INVENTION

It is therefore desirable to provide a decentralized distribution of computing jobs in a computing grid for achieving improved availability of the computing grid in the presence of a large number of computing jobs to be handled.

This problem of the invention is solved by a client for submitting computing jobs in a distributed computing environment, including an input section for receiving a job request with an instruction to execute a computing job; a selection section for obtaining selection information specifying a job handler for handling the computing job; and a submission section for submitting the computing job to the selected job handler. Accordingly, a decentralized handling of the submission of computing jobs can be provided, e.g. from a plurality of clients, thus avoiding a bottle neck associated with a centralized job distribution entity of a distributed computing environment.

According to another embodiment the selection information includes configuration information specifying a job distribution policy and the selection section is arranged to select the job handler based on the job distribution policy. Thus, the selection of a job handler may advantageously be influenced based on the job distribution policy. The job distribution policy may specify for each of a plurality of job handlers at least one of; a time period wherein a distribution of a computing job is allowed; a group membership required; communication characteristics available; a network capacity of a network between the respective job handler and the client; a pre-staging capability; an availability of data; and system characteristics. Thus, with the job distribution policy a pre-selection of a job handler with different levels of granularity may be provided.

According to another embodiment the job distribution policy specifies for each of the plurality of job handlers the availability of services, the services including at least one of a reporting service, a monitoring service, a steering service and a billing service. Thus, with the ability to select a job handler based on the availability of services, an even finer granularity of a job handler selection may be provided.

According to another embodiment the selection section is arranged to obtain a job profile of the computing job and to select the job handler based on the job profile. Thus, the pre-selection according to the above job distribution policy can be facilitated. Further, the job profile could be used to select a job handler at a still finer granularity. The job profile may include at least one of; a memory capacity; a number of processing units required; required software licences; special resources; a type of operations to be performed in connection with the computing job; a security level required for the computing job; a plurality of the computing job; cost limits; time limits; and speed requirements.

According to another embodiment the client includes a plurality of predetermined standard job profiles for a plurality of standard job types. Thus, a job profile specification can be simplified, e.g. a user can select one of the plurality of job profiles for a computing job to be handled.

According to another embodiment the submission section is arranged to transmit an interrogation message to the selected job handler to receive a response message from the selected job handler indicating whether the job handler can handle the job or not; and to transmit the job request to a job broker, if the selected job handler cannot handle the job. Accordingly, after selecting an appropriate job handler, e.g. based on the job profile and the job distribution policy, an indication can be obtained from the selected job handler, whether the computing job can be actually handled. If not, a job broker for further finding a resource for the computing job can be employed.

According to another embodiment the selection section is arranged to identify a plurality of job handlers, suitable for handling the job based on the job profile and the configuration information; and the submission section is arranged to transmit a interrogation message to each of the selected job handlers and to receive an otter message from each of the selected job handlers at least indicating whether the job handlers can handle the job or not. Accordingly, advantageously a plurality of job handlers can be first identified based on the job distribution policy, e.g. in a pre-selection operation, and then the final selection of the job handler can be based on the evaluation of the offer messages.

According to another embodiment the offer messages indicate execution details on at least one element of the job profile and the selection section is arranged to identify one of the plurality of available job handlers based on the offer messages as winning job handler. Thus, in a bidding operation the job handlers may compete for obtaining the order to execute the computing job.

According to another embodiment the offer messages also indicate execution details on at least one element of the job distribution policy and the selection section is arranged to update the job distribution policy based on the offer messages. Therefore, the job policy can always be maintained up to date based on offer messages from the various job handlers.

According to another embodiment the selection section is arranged to identify a plurality of job handlers suitable for handling the computing job and to receive a user selection instruction of one of the identified job handlers. Accordingly, in a decentralized process involving a client a user may select one of a list of job handlers.

According to another embodiment the selection unit is arranged to forward the job request to a job broker and the job broker is arranged to select a job handler and to inform the client on the selected job handler, and the submission means is arranged to submit the computing job to the selected job handler. Accordingly, in an alternative the job request can be forwarded to a broker, potentially holding further information allowing a distribution of the computing job to a job handler and further, the execution of the computing job may take place in direct interaction between the client and the job handler.

According to another embodiment the job handler is one of a control unit of a first computing cluster, the first computing cluster including the client; a control unit of a second computing cluster, the second computing cluster not including the client; a processing unit of the first computing cluster associated with the client; and a job broker associated with the first and second computing clusters. Accordingly, the job handler can be a local processing unit at the client, an element of a computing cluster including the client, or an element of a foreign computing cluster or a centralized broker for all elements.

According to another embodiment the job handler is arranged to instruct a computing resource to execute the computing job. Accordingly, it is not necessarily the job handler to execute the computing job, the computing job can be forwarded to further elements in the distributed computing environment.

According to another embodiment the distributed computing environment is constituted by a computing grid including at least one of the group consisting of: a plurality of computer clusters; at least two computer clusters using different operating systems; and a plurality of storage devices. Accordingly, the computing grid may include computing networks of the same type or different types and further elements such as storage devices.

According to another embodiment the submission section is arranged to transfer information required for or during execution of the computing job to the job handler. Accordingly, an interactive execution of the computing job under control of the client becomes possible.

According to another embodiment, the job request is one of: received from a local source access by the client; generated using a graphical user interface; and generated during execution of a software controlled application. Accordingly, the client, in a decentralized arrangement, may receive the job request from local or remote sources.

According to another embodiment, the client is constituted by a thin client including a client processing module and a server processing module, the client processing module being adapted to receive a job request and the server processing module being arranged to perform operations for selecting a job handler. Accordingly, the client may be distributed over different computing elements, e.g. over a computing network.

According to another embodiment, a system including a plurality of computing devices for handling computing jobs includes a plurality of clients according to the above.

Still further, according to another embodiment a method for submitting computing jobs in a distributed computing environment includes receiving a job request including an instruction to execute a computing job; obtaining selection information specifying a job handler for handling the computing job; and submitting the computing job to the selected job handler.

According to still another embodiment of the invention a program has instructions adapted to cause data processing means to carry out the operations in association with the above embodiments. Still further, a computer readable medium may be provided in which a program is embodied where the program is to make a computer execute the above outlined operations. Still further, a computer program product may comprise the computer readable medium. A data stream or a data structure may have instructions adapted to cause data processing means to carry out at least one of the above operations.

Further advantageous embodiments are disclosed in further claims.

DETAILED DESCRIPTION OF THE PREFERRED EMBODIMENTS

In the following, a first embodiment of the invention will be described with respect to FIG. 1.

Figure 1:
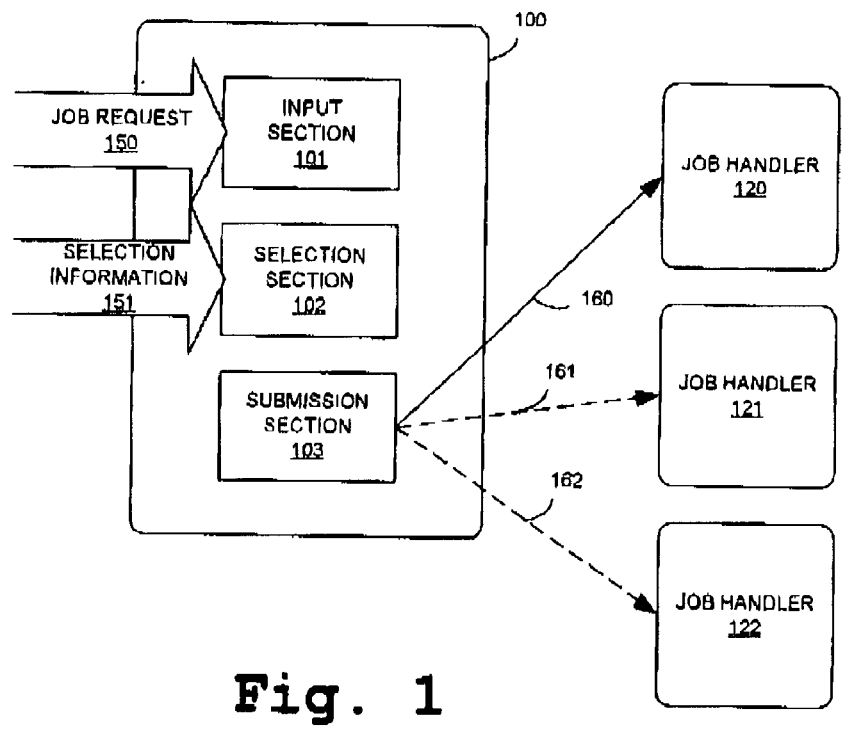
FIG. 1 illustrates elements of a system for submitting computing jobs in a distributed computing environment according to an embodiment of the invention.

FIG. 1 illustrates elements of a system for submitting computing jobs in a distributed computing environment according to an embodiment of the invention including a client 100 for submitting computing jobs in a distributed computing environment. Further, FIG. 1 illustrates three exemplary job handlers 120, 121 and 122 for handling computing jobs.

The client 100 of FIG. 1 includes an input section 101 for receiving a job request including an instruction to execute a computing job. The job request may be received from an external or internal source and is indicated by an arrow 150. Still further, the client 100 includes a selection section 102 for obtaining selection information specifying one of the job handlers 120, 121 and 122 for handling the computing job of the job request. The selection information may be received from an external or internal source, as indicated by the arrow 151. Still further, the client 100 includes a submission section 103 for submitting the computing job to the selected job handler. In the present case it is assumed that the job handler 120 is selected for handling the computing job, and that the submission section submits the computing job to the job handler 120, as illustrated by the arrow 160.

In alternative examples, the selection section may select one of the two remaining job handlers 121 and 122, and the submission section 103 may submit the computing job to the job handlers 121 and 122, as indicated by the dashed arrows 161 and 162.

According to the present embodiment of FIG. 1 a decentralized submission of computing jobs in a distributed computing environment such as a computing grid can be achieved by way of the client 100, e.g. as operated by a user. Accordingly, a bottle neck of a centralized job distribution element can be avoided. Each of a plurality of clients, such as client 100, can make a local decision on a job handler suitable for handling the computing job.

As an example, a user operating the client 100 could execute an application, such as a scientific application for modelling an airflow around a wing of an airplane, as outlined in the introductory portion of the application. During this application a computing job relating to simulating a pressure field around the wing may require a large amount of computing operations. If the client 100 does not have the resources to handle this computing job, or if it is more economical that another computing element handles the computing job, e.g. to maintain the client available for other tasks, the computing job can be forwarded to one of the job handlers 120, 121 and 122, as outlined above. For example, an indication could be provided by the application for modelling the airflow that a computing job suitable for distribution is now to be handled, the computing job in the example relating to simulate the pressure fields. Based thereon, the user, or alternatively directly the application, can select one of the job handlers, in the present example job handler 120, for executing the computing job. The actual selection is handled by the selection section based on the selection information 151, which in one embodiment includes a user instruction specifying the job handler 120.

As illustrated in this example, the need to submit the computing job to a central entity distributing the computing job is eliminated, as the client itself handles the distribution, thus avoiding an associated bottle neck it a plurality of computing jobs from a plurality of clients is to be handled.

Even though FIG. 1 illustrates three job handlers as an example it is understood that an arbitrary number of job handlers may be provided.

In the following, examples of the elements of the system for submitting computing jobs in a distributed computing environment shown in FIG. 1 will be outlined in further detail. It is noted that the following constitutes examples only and should not be construed as limiting the scope of the invention.

First, the elements of the client unit 100 will be outlined in further detail.

The client 100 may generally be constituted by any kind of computing device, such as a general purpose computing device, a desktop computing device, a laptop computing device and a palmtop computing device. In further examples it is possible that any kind of mobile computing device including personal digital assistants (PDA) and mobile telephones is used to distribute computing jobs in a distributed computing environment. Alternatively or in addition thereto the client 100 can be constituted by a software program or a plurality of modules of a software program for realizing the functionality of the client as outlined above. A software program associated with the client 100 may for example be stored in a memory of any kind of computing device and may be executed by a processing unit of the computing device to realize the above outlined functionality. For example, the client may include an input section module, a selection section module and a submission section module stored in a memory of a data processing device, appropriately accessed, retrieved and executed. Thus, the client may also be constituted by a collection of software instructions which can be executed virtually at any data processing device or group of data processing devices. The data processing device may then not be exclusively used to realize the above functionality but also keep resources for further tasks or purposes.

Still further, according to another example, the client 100 may be constituted by a thin client including a client processing module and a server processing module, wherein the client processing module is adapted to receive a job request, e.g. from a local source based on user input or from an application, and the server processing module is arranged to perform operations for selecting a job handler, as outlined above. Thus, even though the client 100 of FIG. 1 is shown as a single unit, according to an alternative the client may be distributed over multiple data processing devices, such as a client processing device and a server processing device, the client processing device and the server processing device being in communication with one another.

According to another example, the client processing module may include a graphical user interface facilitating user interaction such as executing an application and generating a job request, and the server processing module may include elements for performing the selection operations of a job handler and/or submitting the computing job to a selected job handler.

The input section 101 of the client 100 is provided for receiving a job request including an instruction to execute a computing job. Similar to the above, the input section 101 may be constituted by a software module executed on a processing unit of a computing device or may be constituted by a hardware arrangement or a combination of software and hardware. The input section 101 may be arranged to receive the job request from a local source accessed by the client, may be arranged to receive the job request as generated using a graphical user interface, and may be arranged to receive a job request as generated during execution of a software-controlled application.

According to another example, the job request is obtained from a local source accessed by the client 100. The local source may be for example an application program executed at the client or may be a memory storing a number of job requests, e.g. in a stack. Alternatively, the local source may also be a local sensor or other hardware device connected to the client and generating a job request.

As briefly mentioned above, the job request can be generated by use of a graphical user interface, for example involving a display of an input mask on a display device associated with the client 100. In an example a user inputs information via the graphical user interface to generate a job request including an instruction to handle a computing job. This job request may be generated dynamically during the execution of an application such as outlined above, in connection with the application for modelling an airflow around the wing of an airplane.

According to another example, the job request is generated during the execution of a software-controlled application, e.g. automatically under direct control of the application program, for example the application to model the airflow around the wing of an airplane, as outlined above. In this case, the application may automatically generate the job request and trigger a selection of a job handler by the selection section and a submission of the computing job to the selected job handler involving the submission section of the client 100.

The selection section 102 is provided for obtaining selection information specifying a job handler for handling the computing job of the job request. As the input section, the selection section may be constituted by a sequence of software instructions executed on a processing unit or may be constituted by a hardware component or a combination of software and hardware.

According to an example the selection section obtains selection information allowing to make a decision on an appropriate job handler of a plurality of job handlers available. For example, the selection information may include configuration information specifying a job distribution policy, and the selection section selects the job handler based on the job distribution policy. The job distribution policy can be a predefined set of rules for distributing computing jobs to job handlers. In an example, the rules include information on characteristics of each of a plurality of job handlers available for a job distribution, facilitating making a decision on an appropriate job handler.

Still further, according to another example, the selection section obtains a job profile of the computing job and selects the job handler based on the job profile. The job profile describes characteristics of the specific computing job to be distributed to one of the plurality of job handlers and preferably further facilitates the decision making process of the selection section.

In an example, the selection section performs a pre-selection operation based on the job distribution policy, using basic characteristics of the job handler from the job distribution policy and basic job characteristics from the job profile. The basic characteristics from the job distribution policy and the job profile may include information on a time period wherein a distribution of a computing job to a particular job handler is allowed, a group membership required for distribution of a computing job to a particular job handler, communication characteristics available at the job handler, a network capacity of a network between the respective job handler and the client, a prestaging capability of a job handler, the availability of data at the job handler and services provided, such as reporting services, monitoring services, steering services and billing services, and similar. Thus, with the job distribution policy a pre-selection of a job handler with different levels of granularity may be provided, in dependence on the number and type of characteristics maintained for each job handler with the job distribution policy.

In the example, the job profile specifies one or more of the above characteristics, allowing a pre-selection of job handler candidates.

The selection section may then select one of the job handler candidates for executing the computing job. The final selection of a job handler can be performed in a selection operation initiated by the selection section, involving obtaining information on further elements of the job profile from each of the job handlers selected in the pre-selection operation. In an example, this further information includes obtaining offers from each of the candidate job handlers indicating system characteristics of the job handlers. The characteristics may include information on a memory capacity available; a number of processing units available; available software licenses; special resources such as graphic rendering resources, a type of operations available at the job handler, a security level available, and similar.

These characteristics may be specified in the job profile and further, the job profile may specify a required plurality of the computing job, cost limits, time limits and a computing speed requirement.

Based on this information the selection section can now make a final decision on a job handler for handling the computing job and instruct the submission section to submit the computing job to the selected job handler.

The submission section 103 is provided for submitting the computing job to the job handler selected by the selection section 102. Similar to the input section and the selection section, the submission section 103 may be constituted by a sequence of coded instructions for execution on a processing unit for realizing the above outlined functionality of the submission section. Alternatively, the submission section may be constituted by a hardware component. Still further, the submission section may include a combination of software elements and hardware elements.

The submission section 103 is responsible for connecting to the plurality of job handlers in order to submit the computing job to the selected job handler. The connection may be established via any kind of communication link, including connectionless communication networks or dedicated communication links including wireless transmissions. For example, a connection between the submission section 103 and a job handler may include a communication link via a local area computing network, such as a company-wide network or via a wide area network such as the Internet.

Further, according to another example, the submission section is responsible for transmitting interrogation messages to selected job handlers, and to receive corresponding offer message from the job handlers. Also, the submission section may connect to a job broker and transmit the computing job to the job broker as outlined further below.

The connections established between the submission section 103 and the job handlers may go across system boundaries of different systems of the distributed computing environment such as a computing grid.

In the following, examples of the job handlers 120, 121 and 122 will be outlined in further detail.

The job handlers are provided for handling the computing job based on an instruction from the client 100, more precisely the submission section 103. According to an example, handling the computing job includes accessing the resources required for the computing job and executing the computing job. Information on resources required for the computing job may be received at the job handler from the submission section. Alternatively, information required for executing the computing job may be included in the instruction from the submission section 103.

According to another example, handling the computing job includes performing a further selection operation at the job handler, to select a computing resource for the computing job. A computing resource may for example be a processing unit associated with the job handler, and may also include a memory associated with the processing unit or the job handler and any other resources required for executing a computing job. The selection operation at the job handler may he based on availability of a computing resource, characteristics of the computing resource and similar. According to an example, the job handler is constituted by a large computing device such as a server, itself connecting to a plurality of computing resources. According to another example, the job handler is any kind of computing device with the capabilities to execute the computing job.

As outlined above, the client 100 shown in FIG. 1 is provided for submitting computing jobs in a distributed computing environment including a plurality of distributed computing devices. The client may be operated by a user and also used for executing arbitrary further computing operations such as for the above exemplary application for modelling an airflow around the wing of an airplane. In an example the distributed computing environment is a computer network such as a local area network, e.g. of a company, or a wide area network, e.g. the Internet.

In another example the distributed computing environment is a computing grid being an association of a plurality of computing devices similar to a computer network with the main intention to offer and use idle computing power. The computing devices of the computing grid may be located generally at arbitrary locations and include the client 100, the job handlers 120, 121, 122, possibly further job handlers and further computing resources, for example storage devices and similar. Computing grids are provided for utilizing untapped computing capacities available over a computing network. Usually, computing devices are only for sometime during a day, for example during work hours, heavily utilized and potentially idle during the rest of day. Computing grids allow the distribution of computing jobs from one data processing device to another data processing device, for example a data processing device currently being idle.

As outlined above, the client 100 forms part of a computing grid and is able to submit computing jobs to remote job handlers, also forming part of the computing grid. Thus, the client, e.g. a data processing device operated by a user, is able to submit computing jobs, for example computing jobs occurring in connection with an application executed by a user, to remote job handler. As each of a plurality of clients of the computing grid can locally make a decision on a job handler for executing the computing job, potential bottle neck in association with a single centralized job distribution element is avoided.

According to an example the computing grid of the present embodiment includes as a key element the client 100 and further clients and a plurality of job handlers. With the client and the job handlers the computing grid provides a computing infrastructure that enables a decentralised distribution of computing jobs, thus allowing decentralised access to idle computing resources and thus enabling cost reductions.

According to an example the computing grid consists of a layered architecture with resource management loading the computing grid. Elements of the resource management may include the client and the job handlers. An infrastructure is provided including software for linking the computational elements of the computing grid. Further, according to another example system management may be provided for monitoring the behaviour of the computing grid. Also, portals can be provided for enabling easy access to the computing grid. For example web browsers may be used to generate job requests and may be used to submit computing jobs to selected job handlers.

Further, according to an example the computing grid also includes a plurality of web servers, high-speed storage devices and computing resources for enabling handling of computing jobs.

Further, the computing grid may include computing devices of a single cluster, a cluster consisting of one or more systems working together to provide a single point of access to users. A cluster may be owned and used by a smaller number of users, such as a project or department.

Further, the computing grid may include a larger number of computing devices and may constitute a so-called enterprise grid. A enterprise grid can combine individual clusters, e.g. of multiple projects or departments of a company. A enterprise grid may consist of distributed computing devices and servers as well as centralized resources located in individual clusters. For example, a enterprise grid may he used in collaborative engineering, in applications for mining large data bases, rendering frames for animations, and absorbing increased load during cyclical business processes and similar.

Furthermore, a computing grid may constitute a global grid including a collection of enterprise grids and/or clusters. To be able to appropriately interact the individual elements of the global grid will have agreed upon global usage policies and communication protocols however, do not necessarily have to have the same implementation.

Generally, a computing grid may thus accommodate different computing systems, such as computing devices running under different operating systems or communication protocols. However, what is required for distributing computing jobs to the entire computing grid, is a commonly adopted communication protocol for exchanging information between the client 100 and the job handlers. This includes defined format and content for messages exchanged between the client and the job handlers relating to interrogating a job handler, submitting computing jobs and similar.

In the embodiment of FIG. 1 the job handlers 120, 121 and 122 do constitute elements of a local cluster, a enterprise grid or a global grid. Further, the client 100 may select a job handler across cluster or enterprise grid boundaries, provided that communication protocols comply with one another.

In the following a further embodiment of the invention will be described with regard to FIG. 2.

Figure 2:
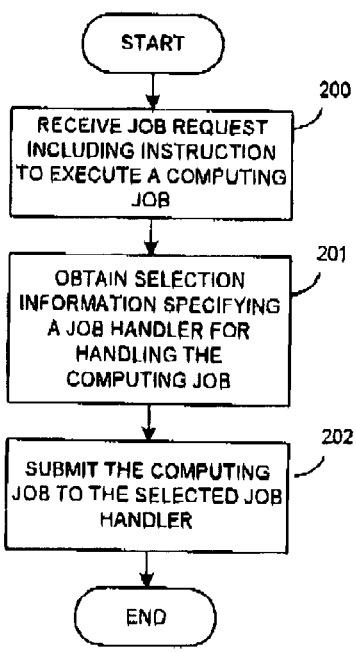
FIG. 2 illustrates operations of a method for submitting computing jobs according to an embodiment of the invention.

FIG. 2 shows operations of a method for submitting computing jobs in a distributed computing environment such as a computing grid according to another embodiment of the invention.

The operations of FIG. 2 may be executed using the system illustrated in FIG. 1, however, FIG. 2 is not limited thereto.

In a first operation 200 a client such as the client 100 of FIG. 1 receives a job request including an instruction to execute a computing job. In an example the job request is received from a local source, e.g. a source accessed by the client. For example, the local source is a local storage device, a local input device such as a keyboard and a graphical user interface. The graphical user interface may form part of a program for browsing information on computing networks such as the Internet.

Still further, the job request may be generated during the execution of a controlled application such as an engineering, research, scientific application or similar. Also, the job request may be received from a remote source, e.g. a data processing device connectable to the client 100.

The job request including the instruction to execute the computing job preferably includes all information necessary for executing the computing job and/or for defining the execution specifics, as outlined above. For example, the job request includes information on the type of computing job, resources required for executing the computing job and data to be processed. Moreover, the job request may include instructions of the program constituting the computing job, e.g. a mathematical operation, a rendering operation and similar.

As an alternative to the above or in addition thereto the job request may also include an indication of a storage location of the above outlined information of the job request, at a local storage device and/or remote storage remote device. It is noted that the job request may include further information, as it will be outlined further below.

In an operation 201 the client obtains selection information specifying a job handler for handling the computing job of the job request. Preferably, the selection information includes all information necessary for making a decision to select a specific job handler such as one of the job handlers 120, 121 and 122 of FIG. 1. In an example, the selection information may be specified by a user operating the client or may be obtained from any other source. Also, the selection information can be included in the job request, and may specify a particular type of job handler required for executing the computing job. As an example, the selection information may specify a specific operating system, required resources and similar, enabling the selection of a suitable job handler. The selection is carried out by a selection section such as the selection section 102 of FIG. 1.

In an example, the selection section obtains the selection information and accesses data specifying corresponding features of a plurality of job handlers, for example, in a configuration file specifying features of a plurality of job handlers available. Then, the selection section may identify a suitable job handler matching the selection information in association with the job request.

Thereafter, in an operation 202 the computing job is submitted to the selected job handler, e.g. by the submission section 103 of FIG. 1. Submitting the computing job to the selected job handler in one example includes establishing a connection to the selected job handler and submitting all information necessary for executing the computing job. As outlined above, this may include all necessary information on resources and data required to execute the computing job.

After execution of the computing job at the selected job handler the job handler may return a processing result to the client or may provide a processing result to a further computing element e.g. for storage or for further processing thereat.

According to a further alternative, the submission section transfers information to the job handler, which is required for or during execution of the computing job. Thus, an interactive communication between the job handler and client may be carried out, including monitoring, steering and controlling execution of the computing job.

It is noted that a program or programs may be provided having instructions adapted to cause a data processing device or a network of data processing devices to realize elements of the above embodiments and to carry out the method of at least one of the above operations. Further, a computer readable medium may be provided, in which a program is embodied, where the program is to make a computer execute the method of the above operation.

Also, a computer-readable medium may be provided having a program embodied thereon, where the program is to make a computer or a system of data processing devices to execute functions or operations of the features and elements of the above described examples. A computer-readable medium can be a magnetic or optical or other tangible medium on which a program is recorded, but can also be a signal, e.g. analog or digital, electronic, magnetic or optical, in which the program is embodied for transmission. Further, a data structure or a data stream may be provided including instructions to cause data processing means to carry out the above operations. The computer-readable medium may be constituted by the data stream or the data structure. Still further, a computer program product may be provided comprising the computer-readable medium.

In the following a further embodiment of the invention will be described with respect to FIG. 3.

Figure 3:
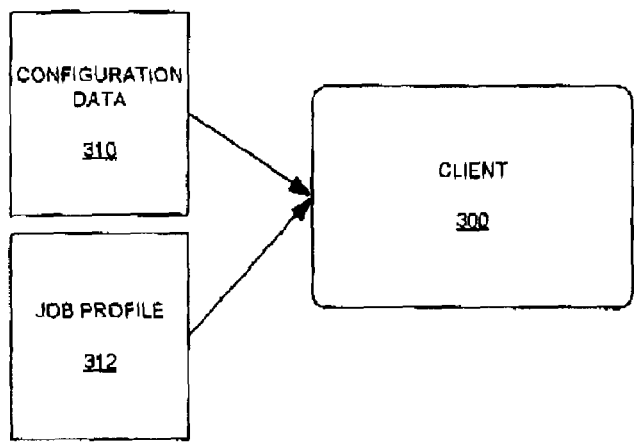
FIG. 3 illustrates elements of a system for submitting computing jobs according to another embodiment of the invention.

FIG. 3 illustrates elements of a system for submitting computing jobs according to an embodiment of the invention and particularly illustrates elements required for improving the selection of a job handler at a client.

FIG. 3 illustrates a client 300 substantially similar to the client 100 shown with regard to FIG. 1. Further, FIG. 3 shows configuration data 310, constituting configuration information specifying a job distribution policy. Still further, FIG. 3 shows a job profile 312 specifying characteristics of a computing job to be handled.

The configuration data 310 and the job profile 312 may be represented in a data file or a database and may be stored locally at the client 300. In an alternative embodiment the configuration data and/or the job profile is available at a remote location and accessed by the client 300 upon receiving a job request.

The configuration data specifying the job distribution policy and the job profile specifying the job characteristics enable a selection section of the client 300 to select an appropriate job handler. The job distribution policy in the present embodiment includes information on characteristics of each of a plurality of job handlers available for the execution of computing jobs submitted by the client 300. Thus, the job distribution policy may be used by the selection section to make a pre-selection of one or a plurality of job handlers suitable for handling the computing job. The selection is preferably carried out on the basis of information available with the job profile, by comparing the elements of the job distribution policy and the requirements of the job profile.

After making a pre-selection the selection section can finally select one of the candidate job handlers based on further information obtained from the candidate job handlers, e.g. based on further requirements of the job profile.

Accordingly, the selection section may establish a two-tier selection operation with first selecting a plurality of candidate job handlers and based on the job distribution policy handled by selecting one of the candidate job handlers based on an interrogation of the individual job handlers.

According to an embodiment the job distribution policy specifies for each of a plurality of job handlers a time period wherein a distribution of a computing job to the respective job handlers is allowed. This may for example be a time period of low utilization of the job handler or of computing resources associated with the job handler. For example, if the job handler or computing resources associated therewith are mainly used during day time e.g. during office hours of a company operating the job handler and associated computing resources, computing jobs could be accepted for execution during night tire when the job handler is substantially idle.

According to a further example the job distribution policy specifies for each of a plurality of job handlers a group membership required in order to be allowed to distribute a computing job thereto. For example, job handlers could require a subscription to a service plan in order to accept a computing job from a particular client. Accordingly, the job distribution policy could specify which group memberships are required for being authorized to submit a computing job to a particular job handler.

Still further, according to another example, the job distribution policy specifies for each of a plurality of job handlers communication characteristics available at a particular job handler, for example, including a security level provided during execution and handling of a computing job. Communication characteristics can also include communication protocol compatibility.

According to another example, the job distribution policy specifies for each of a plurality of job handlers a network capacity of a network between the respective job handler and the client, enabling a decision making process for distributing the computing job to a job handler based on e.g. an available bandwidth.

According to another example, the job distribution policy specifies a pre-staging capability of the individual job handlers, indicating whether a job handler is in the position to perform preparatory operations before actually receiving the computing job. The pre-staging operations can include pre-fetching of data required for the computing job, freeing resources for handling the computing job and similar.

According to another example, the job distribution policy specifies an availability of data at the respective job handlers. The availability of data may include an authorisation of the job handler for associated computing resources to access data, for example, data necessary for the computing job. Further, the availability of data may include information on accessibility of databases or computing resources from a particular job handler.

Still further, according to another example, the job distribution policy specifies system characteristics of the individual job handlers, including, for example, a memory capacity available, a number of processing units required, required software licences, special resources, e.g. for graphic rendering operations, a special type of operation for execution, e.g. using certain hardware support or similar, e.g. for rendering operations, Fast Fourier Transform etc.

Moreover, according to an example the job distribution policy specifies for each of the plurality of job handlers, the availability of services, including at least one of a reporting service, a monitoring service, a steering service and a billing service.

Here a reporting service relates to the ability of a job handler to perform a reporting function in association with the handling of the computing job, e.g. indicating execution in details and similar.

The monitoring service relates to a service allowing a source, e.g. the client, of the computing job to monitor the execution of the computing job, e.g. online, to obtain information on the execution of the computing job during runtime.

The steering service includes the ability of a job handler to obtain control information during the execution of the computing job, e.g. for influencing the execution of the computing job during handling operations. The steering service may require an interactive communication between the client and the job handler or a computing resource used for executing the computing job.

The billing service may include all services in connection with billing for rendered services, such as used computing cycles, used resources and similar.

The above outlined elements of the job distribution policy enable the selection section to make a pre-selection of one or a group of candidate job handlers for the computing job.

Further, as outlined above, the selection operation is further based on a job profile specifying requirements in association with the computing job. The job profile preferably specifies characteristics of the computing job further facilitating a selection of a job handler. The job profile may include information on a memory capacity required for an execution of the computing job. Further, the job profile may include a number of processing units required for suitable execution of the computing job. This may be particularly relevant in case the computing job is suitable for parallel execution. Still further, the job profile may include information on required software licences and special resources, such as required hardware for a rendering operation and similar. Still further, the job profile may include information on a type of operations to be performed in connection with the computing job for example, specifying certain types of computational operations, e.g. operations suitably carried out using hardware support, such as rendering operations, Fast Fourier Transform etc. Still further, the job profile may include information on a security level required for the computing job, along with a source of the job request to specify a confidentiality level. Moreover, the job profile may include a priority of a computing job required for handling the job. Still further, the job profile may include information on a cost limit for the computing job, a time limit for the computing job and speed requirements.

In an example this information of the job profile is advantageously used to further specify a job handler for the computing job. The information corresponding to the requirements of the job profile is obtained either from the job distribution policy or may be obtained in an interrogation of the job handlers using an interrogation message and a response message transmitted between the client and the respective job handlers.

In an alternative embodiment a plurality of predetermined standard job profiles is provided for a plurality of standard job types. A standard job profile may correspond to a frequently used type of computing job and may be user specified. Thus, a user may for example specify one of the plurality of predetermined standard job profiles for accelerated selection operations.

In the following a further embodiment of the invention will be described with respect to FIG. 4.

Figure 4:
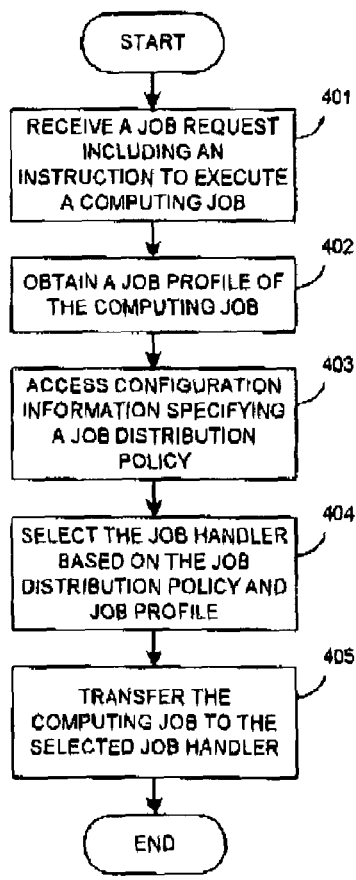
FIG. 4 illustrates operations of a method for submitting computing jobs according to another embodiment of the invention, particularly illustrating operations for obtaining a job profile and accessing a job distribution policy.

FIG. 4 illustrates operations of a method for submitting computing jobs in a distributed computing environment according to another embodiment of the invention, particularly for illustrating operations and for obtaining a job profile and accessing configuration information to specify a job distribution policy. The operations of FIG. 4 may be carried out using the system of FIG. 1 or FIG. 3, however, FIG. 4 is not limited thereto.

In a first operation 401 a client receives a job request including an instruction to execute a computing job, as for example outlined with respect to previous embodiments.

In an operation 402 the client obtains a job profile of the computing job, e.g. from a remote source or a local source, as outlined above. For example, the job profile is received with the job request.

In an operation 403 the client accesses configuration information specifying a job distribution policy such as outlined above.

Then, in an operation 404 the client selects a job handler based on the job distribution policy and the job profile. According to an example the appropriate job handler is selected based on the distribution policy, as outlined above. Further the appropriate job handler can be selected based on a comparison of the job distribution policy specifying characteristics of the job handlers and the job profile specifying the computing job, e.g. involving a first-tier selection of one or a plurality of job handlers based on the distribution policy and a second-tier selection of job-handlers of the first-tier selection based on elements of the job profile. The second-tier selection may include an interrogation of the job handlers, as outlined further below.

Thereafter, in an operation 405 the computing job is transferred to the selected job handler. The job handler may then itself execute the computing job or may instruct a computing resource connected to the job handler to execute the computing job.

Accordingly, a decentralized decision on an appropriate job handler can be carried out under control of one of a plurality of clients of the distributed computing environment or computing grid, avoiding a bottle neck of a central job distribution facility.

It is noted that the sequence of operations shown in FIG. 4 may be altered in alternative embodiments, particularly operation 403 may be carried out before operation 402.

In the following a further embodiment of the invention will be described with respect to FIG. 5.

Figure 5:
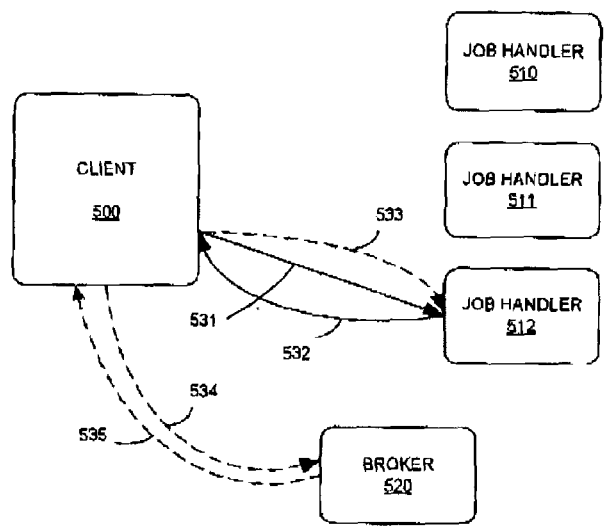
FIG. 5 illustrates elements of a system for distributing computing jobs according to another embodiment of the invention, particularly illustrating a flow of messages between job handlers and the client.

FIG. 5 particularly illustrates elements and messages transmitted between a client and a job handler in order to inquire whether the job handler is available for handling the computing job.

FIG. 5 illustrates a client 500, which substantially may correspond to the client 100 of FIG. 1. Further, FIG. 5 illustrates a job handler 510, 511 and 512, substantially corresponding to the job handlers 120, 121 and 122 of FIG. 1. A detailed description of the elements thereof is thus omitted here. The job handlers are again responsible for handling computing jobs submitted by the client. The job handlers may for example be one of a control unit of a first computing cluster, the first computing cluster including the client; a control unit of a second computing cluster, the second computing cluster not including the client; or a processing unit of the first computing cluster associated with the client.

Further, FIG. 5 shows a job broker 520 having further resources for selecting a computing resource for a computing job.

During operation the client 500 receives a job request including an instruction to execute a computing job, obtain selection information specifying a job handler for handling the computing job and submits the computing job to the selected job handler.

According to the embodiment of FIG. 5, before submitting the computing job to the selected job handler the client 500 inquires at the selected job handler whether the job handler is available for handling the computing job.

In the embodiment of FIG. 5 it is assumed that the job handler 512 is selected for executing a computing job. Therefore, as illustrated by an arrow 531 the client issues an interrogation message to the job handler 512, requesting the job handler 512 to indicate whether it is available for handling the computing job. The job handler 512 responds by a message indicating its availability, as illustrated by an arrow 532.

Based on the response message, if the job handler is available for handling the computing job, the client submits the computing job to the job handler 512 as indicated by the arrow 533.

If the job handler 512 indicates that it is not available for handling the computing job, the computing job is submitted to the job broker 520, as indicated by the arrow 534, for further distribution operations. For example, the job broker may maintain information on further job handlers suitable for handling the computing job. The job broker may be a centralized entity for distributing computing jobs which cannot be distributed based on a local decision at the client. Thus, the job broker may essentially correspond to the prior art centralized job distribution facility. The job broker may also consist of a plurality of distributed job broker units.

Alternatively, the client may submit an interrogation message to the job broker, as indicated by the arrow 534, e.g. based on a user instruction or automatically, instructing the job broker to identify a suitable job handler. The job broker will then return a response with an indication of a suitable job broker to the client, as indicated by the arrow 535, which in turn can submit the computing job to this job handler.

In operation a selection unit may be arranged to forward the job request to the job broker and the job broker may be arranged to select a job handler and to inform the client on the selected job handler. Submission means may then submit the computing job to the selected job handler.

Alternatively, the computing job may be handled locally or a distribution is postponed to a later point in time. For example distribution attempts for a computing job may be repeated at regular time intervals, similar to a re-dialing functionality in a telephone system.

In an alternative, if the client 500 obtained an indication that a plurality of further job handlers is suitable/available for handling the computing job, and if the job handler 512 indicates its unavailability for handling the computing job, the client 500 may transmit interrogation messages and receive response messages to and from job handler 511 and 510, respectively, until an available job handler is identified. For example, the interrogation message may be transmitted first to a job handler suited best for handling the computing job and then to a job handler suited second best for handling the computing job and so on.

The embodiment of FIG. 5 enables the client to decide whether the selected job handler, selected based on selection information, is actually available for handling the computing job. If not, the computing job may be delayed, handled locally or submitted to an alternative job handler or to a job broker.

In the following a further embodiment of the invention will be described with respect to FIG. 6.

Figure 6:
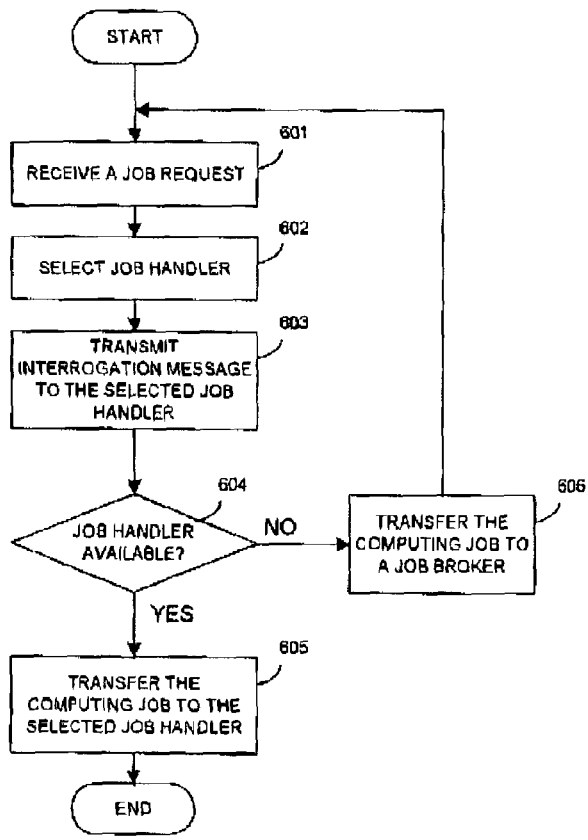
FIG. 6 illustrates operations of a method for submitting computing jobs according to another embodiment of the invention, particularly outlining operations for interrogating availability of the job handlers.

FIG. 6 illustrates operations of a method for submitting computing jobs in a distributed computing environment according to another embodiment of the invention, particularly outlining operations in connection with interrogating job handlers. The operations may be carried out using the clients illustrated in FIGS. 1, 3 and 5, however, FIG. 6 is not limited thereto.

In a first operation 601 a job request is received at a client, as outlined before.

In an operation 602 a job handler is selected, e.g. based on configuration information and a job profile, as outlined before.

Then, in an operation 603 an interrogation message is transmitted to the selected job handler, in order to inquire whether the selected job handler is actually available for handling the computing job. The interrogation message may include elements of the job profile to further specify the job and enabling the target job handler to make a decision whether the computing sob could be handled. For example, the interrogation message could include a required time for execution. This could be tied to a time out for a response, i.e. if the job handler cannot provide a response within a specified time frame as specified in the job profile, this particular job handler is not to be selected. Further, the job profile could specify a cost limit, i.e. a maximum cost for an execution, required security levels, memory requirements for the computing job, a number of requested computing cycles, and similar.

In an operation 604 the job handler responds with a response message indicating whether the job handler is available. The job handler may, for example, be unavailable, if a processing load is currently too high to handle the additional computing job.

If in operation 604 the decision is "YES", indicating that the client determines that the job handler is available, in an operation 605 the computing job is transferred to the selected job handler.

If in operation 604 the decision is "NO", indicating that these job handler is not available for handling the computing job, in an operation 606 the computing job is transferred to a job broker, e.g. for further searching for a job handler. Alternatively, the computing job may be handled locally at the client, e.g. using a client processing unit.

In the following a further embodiment of the invention will be described with regard to FIG. 7.

Figure 7:
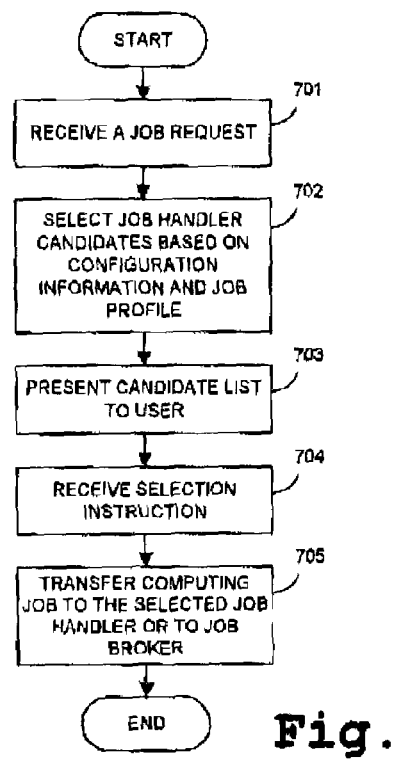
FIG. 7 illustrates operations for submitting computing jobs according to another embodiment of the invention, particularly outlining user selection input.

FIG. 7 illustrates operations of a method for submitting computing jobs in a distributed computing environment according to another embodiment of the invention, particularly outlining user selection operations for selecting a suitable job handler of a plurality of job handlers.

In an operation 701 a job request is received at a client, for example as outlined before.

Thereafter, in an operation 702 the client selects job handler candidates based on configuration information and on the job profile. For example, the selection operation may include comparing the configuration information with information of the job profile, as outlined with regard to previous embodiments. The result of the comparison operation may be a number of a job handlers generally suitable for handling the computing job.

In an operation 703 the candidate list is presented to a user of the client, e.g. using a visual representation of a list of available job handlers on a display device associated with the client. The candidate list may include information on characteristics of the candidate job handlers, allowing a user to select the most appropriate job handler. For example, the candidate list could include information on an estimated processing speed, costs for executing the computing job and similar.

Thereafter, in an operation 704 the client receives a selection instruction, e.g. from a user based on the presented candidate list. According to an embodiment a user may select one of the job handlers using a mouse and pointer device, e.g. by clicking on a corresponding selection field of the candidate list.

In an operation 705 the computing job is then transmitted to the selected job handler. Further, the computing job may be transmitted to a job broker, if none of the job handlers suits the user's need. Still further, the computing job may be scheduled for local execution, e.g. by a processing unit of the client, it the user does not identify a suitable job handler.

The operations of FIG. 7 enable a user to decide on a job handler for handling the computing job and further enable a user to decide on local execution or submission of the computing job to a job broker. Thus, by performing this selection of an execution element for the computing job locally at the client, considerable resources can he freed in a computing grid, as compared to a computing grid making a centralized decision on a distribution of a computing job.

In the following a further embodiment of the invention will be described with respect to FIG. 8.

Figure 8:
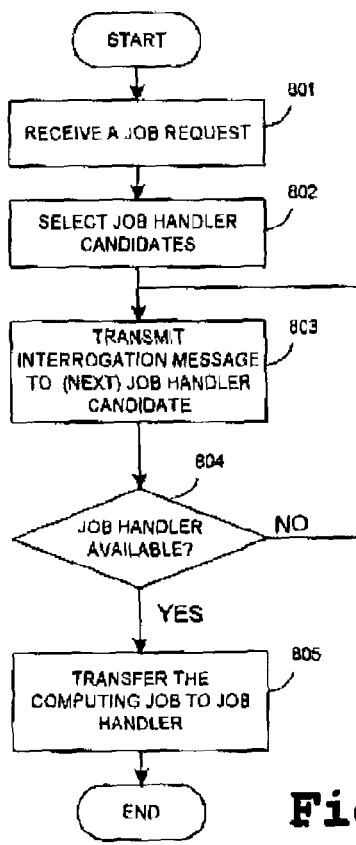
FIG. 8 illustrates operations of a method for submitting computing jobs according to another embodiment of the invention, particularly outlining interrogating a plurality of job handlers.

FIG. 8 describes operations of a method for submitting computing jobs, particularly outlining operations for interrogating a plurality of job handler candidates.

In a first operation 801 a job request is received at a client, as for example outlined with respect to previous embodiments.

In an operation 802 the client selects one or a plurality of job handler candidates generally suitable for handling the computing job, e.g. based on a comparison of a job distribution policy and a job profile received with the job request. This initial selection may be termed pre-selection and is based on a first group of job handler dependent characteristics of the distribution policy.

Thereafter, in an operation 803 an interrogation message is transmitted to a first one of the candidate job handlers, as outlined before. This may be the first job handler in a sequence of job handlers identified. Alternatively the interrogation message may be transmitted to a job handler suited best for handling the computing job.

In an operation 804 it is determined at the client, based on a response message, whether the interrogated job handler is available for handling the computing job.

If in operation 804 the decision is "NO", indicating that the current job handler is not available for handling the computing job, the flow returns to operation 803 and an interrogation message is transmitted to a next job handler of the candidate job handlers. Operations 803 and 804 are then repeated, until in operation 804 a job handler is determined to be available for handling the computing job, in which case the decision in operation 804 will be "YES".

Prior to interrogating the candidate job handlers the job handlers may be arranged in a sequence starting with the candidate job handler suited best for handling the job followed by the candidate job handler suited second best for the computing job and so on and so forth. Subsequently the candidate job handler may be interrogated in the established sequence to select the "best" available job handler. Arranging the candidate job handlers in a sequence may include arranging the job handlers in accordance with a grade of compliance with the configuration information and/or elements of the job profile.

Then, in an operation 805 the computing job is transmitted to the job handler available for handling the computing job.

Accordingly, a plurality of job handlers may be interrogated and the computing job may be transmitted to the first job handler of the candidate job handlers available for handling the computing job.

In the following a further embodiment of the invention will be described with respect to FIG. 9.

Figure 9:
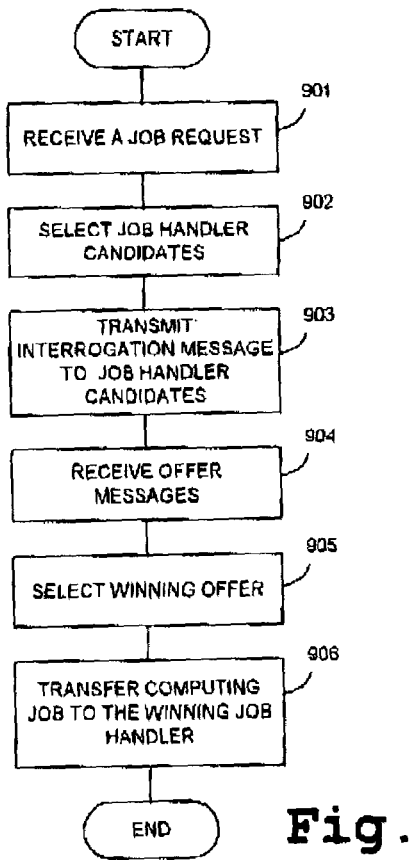
FIG. 9 illustrates operations of a method for submitting computing jobs according to another embodiment of the invention, particularly outlining a bidding procedure for selecting a winning job handler.

FIG. 9 outlines operations of a method for submitting computing jobs in a distributed computing environment, particularly outlining operations for a bidding procedure among a plurality of job handlers.

In a first operation 901 a job request is received at a client, e.g. as outlined before.

Thereafter, in an operation 902 a plurality of job handler candidates is selected based on a comparison of a job distribution policy and a job profile. All job handlers generally complying with the requirements of the job according to the distribution policy are selected. In the selection operation the job profile or predetermined selection rules can be used, e.g. selection rules preset by a user, preset by an application etc. This selection of job handler candidates may be considered to constitute a pre-selection of operation.

For further illustration an exemplary case is described below.

According to the example it is assumed that four job handlers 1, 2, 3 and 4 are available, as indicated in Table 1. Further, it is assumed that a job distribution policy specifies for each of the job handlers a time of availability, information on a pre-staging capability, and capability to provide billing statements.

TABLE 1

| | (policy) | | | |
|---|---|---|---|---|
| policy | handler 1 | handler 2 | handler 3 | handler 4 |
| time | 11 pm–2 am | 24 hrs | 24 hrs | 24 hrs |
| pre-staging | yes | yes | yes | no |
| billing | yes | yes | yes | no |

Table 1 illustrates the distribution policy for each of the handlers 1, 2, 3 and 4, More precisely, in the example the job handler 1 is available for handling computing jobs between 11 pm and 2 am, while the job handler 2, 3 and 4 all are available 24 hours a day for handling computing jobs. Further, job handlers 1, 2 and 3 are assumed to have a pre-staging capability, while job handler 4 does not have a pre-staging capability. Still further, job handlers 1, 2 and 3 have a billing capability while job handler 4 does not have a billing capability.

Moreover, according to the present example, a job profile of a computing job to be handled is assumed to be as outlined in Table 2.

TABLE 2

| (job profile) | |
|---|---|
| time | 8–10 am |
| pre-staging | yes |
| billing | yes |
| memory | 250 GB |
| cost limit | €120 |
| processors | 20 |

As shown in table 2 a time for execution of the computing job is required to be between 8 am and 10 am and further, the job profile requires a pre-staging capability and the capability to generate billing statements.

Based on a comparison of the entries of table 1 and the job profile of table 2, candidate job handlers suitable for handling the computing job can be identified. In the present example job handlers 2 and 3 both fulfill the requirements of the job profile and therefore constitute candidate job handlers for executing the computing job.

After selecting the candidate job handlers in operation 902 an interrogation message is transmitted to the job handler candidates in an operation 903. The job interrogation message preferably includes characteristics of the job profile which cannot be or should not be checked based on a job distribution policy, for example, because they are related to current and transient conditions at the job handlers which cannot or should not be reflected in the job distribution policy.

In the present example, as further shown in Table 2, the job profile further indicates a memory requirement, a cost limit and required processors for executing the computing job.

Therefore, the interrogation message transmitted to the candidate job handlers handler 2 and handler 3 will include information on the job requirements regarding memory capacity, cost limits and processors, in the present case being 250 GB memory requirement, a cost limit of €120, and a requirement of 20 processors.

The candidate job handlers receiving the interrogation message answer by providing offer messages back to the client in an operation 904 allowing the client to finally select a suitable job handler. The offer messages preferably indicate execution details on at least one element of the job distribution policy.

In the present example, as shown in Table 3, it is assumed that the job handler 2 offers 300 GB of memory, a cost estimate of €100 and 20 processors. Moreover, handler 3 is considered to offer 200 GB of memory space, costs of €90 and 20 processors for handling the computing job.

TABLE 3

| | (offer) | |
|---|---|---|
| offer | handler 2 | handler 3 |
| memory | 300 GB | 200 GB |
| cost estimate | €100 | €90 |
| processors | 20 | 20 |

Based on the individual offer messages the client now, in an operation 905, selects a winning offer which in the present case is job handler number 2, as job handler number 3 does not fulfill the memory requirements.

If in operation 905 a plurality of job handlers still would be available for handling the computing job, e.g. a cheapest job offer could be selected.

Thereafter, in an operation 906 the computing job is transferred to the winning job handler. Accordingly, the embodiment allows to perform a bidding between different job handlers to obtain a most economical handling of the computing job.

In a further alternative the job distribution policy may be updated based on the offer messages. The update operation may involve comparing the elements of the offer message with the elements of the job distribution policy and, if a difference is detected, replacing the corresponding element of the job distribution policy. Thus the job distribution policy can always be maintained on a latest state.

Also, the offer messages could be used for presentation to a user, e.g. to support the user in making a decision on a desired job handler. This is particularly advantageous, if an automatic decision cannot be made, for example, if a plurality of job handlers are generally suited for the job execution.

In the following a further embodiment of the invention will be outlined with regard to FIG. 10.

Figure 10:
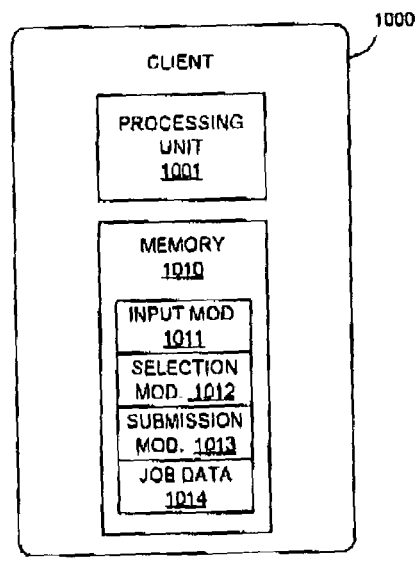
FIG. 10 illustrates elements of a system for submitting computing jobs according to another embodiment of the invention.

FIG. 10 shows elements of a client for submitting computing jobs in a distributed computing environment according to another embodiment of the invention.

FIG. 10 illustrates a client 1000, a processing unit 1001 and a memory 1010. The client 1000 may be constituted by generally an arbitrary kind of computing device, similar to the embodiment of FIG. 1. The processing unit 1000 may be a central processing unit of the client, and may include one or a plurality of processing elements.

The memory 1010 may be a system memory of the client 1000 including a cash, a random access memory and a hard disc and similar. The memory 1010 is shown to include an input module 1011, a selection module 1012, a submission module 1013 and job data 1014. The elements 1011–1014 may be constituted by binarised data stored in memory sections of the memory 1010. Further, the input module, the selection module and the submission module may be represented by coded instructions for making a data processing device to function in accordance with the above outlined embodiments. Still further, the job data 1014 may constituted by binarised information stored in the memory 1010 required for executing the computing job. This may include computing operations in association with the computing job, data to be processed and/or information on storage locations of data associated with the computing job.

In the following further embodiments of the invention will be described with respect to FIG. 11.

Figure 11:
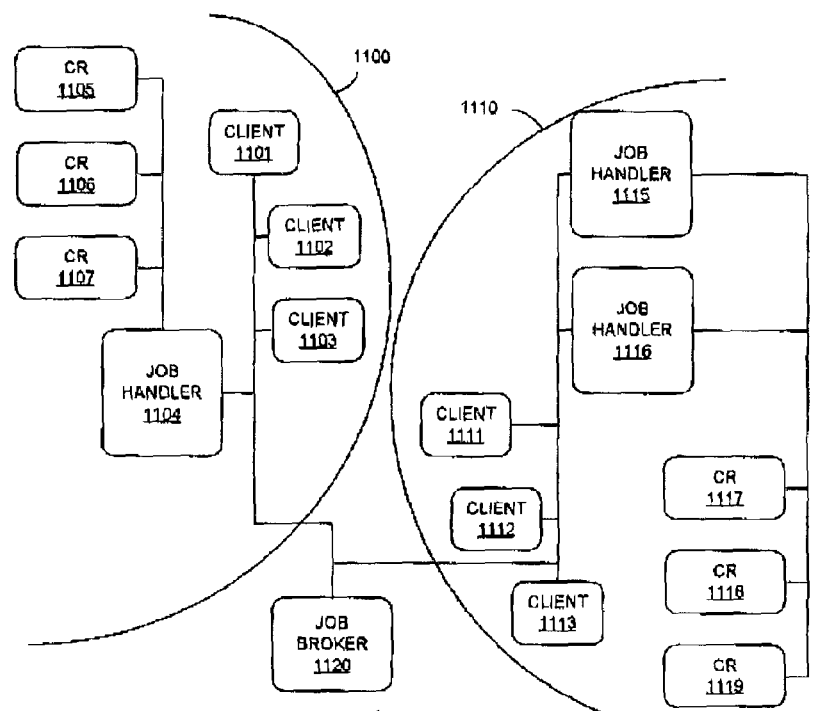
FIG. 11 illustrates elements of a system for submitting computing jobs according to another embodiment of the invention.

FIG. 11 illustrates elements of a computing grid including a plurality of clients for submitting computing jobs showing a practical example of a system including clients for a distributed selection of job handlers for handling computing jobs.

In the example of FIG. 11 two computing clusters or enterprise grids are illustrated. A first computing grid 1100 includes three clients 1101, 1102 and 1103. Further, the first computing cluster 1100 includes a job handler 1104 and computing resources 1105, 1106 and 1107.

The second computing cluster 1110 is shown including three clients 1111, 1112 and 1113. Further, the second computing cluster 1110 includes two job handlers 1115 and 1116. And, the computing cluster 1110 includes computing resources 1117, 1118 and 1119.

The computing resources of the computing clusters 1100 and 1110 may include any kind of processing resource and/or storage resource.

Finally, the computing grid shown in FIG. 11 includes a job broker 1120, as outlined before.

It is noted that the elements shown in FIG. 11 constitute examples only and that, for example, further clients, job handlers and/or computing resources may be provided in the individual computing clusters.

In the embodiment of FIG. 11 the clients 1101–1103 and 1111–1113 are operatively in communication with each of the job handlers 1104, 1115 and 1116. Still further, the clients are operatively in communication with the job broker 1120.

The job handler 1104 is in communication with the computing resources 1105, 1106 and 1107. Moreover, the job handlers 1115 and 1116 are in communication with the computing resources 1117, 1118 and 1119. The communication may be carried out using a computer network and/or dedicated communication links.

In operation each of the clients of the computing grid may receive job requests, e.g. from a user and may select one of the job handlers for handling execution of the computing jobs. The job handlers, in turn may execute the computing job or assign a computing resource with the execution of the computing jobs. Alternatively the clients of the computing grid may use the job broker for further distribution operations of computing jobs. The decision made at the clients may respectively be based on job distribution policies available at the individual clients, job profiles of the respective computing jobs and may also be based on user instructions of users operating the individual clients.

Accordingly, the computing grid enables a decentralized distribution of computing jobs in the computing grid, thus avoiding a bottleneck of a centralized job distribution element.

In the following further embodiments of the invention will be described with respect to FIG. 12.

Figure 12:
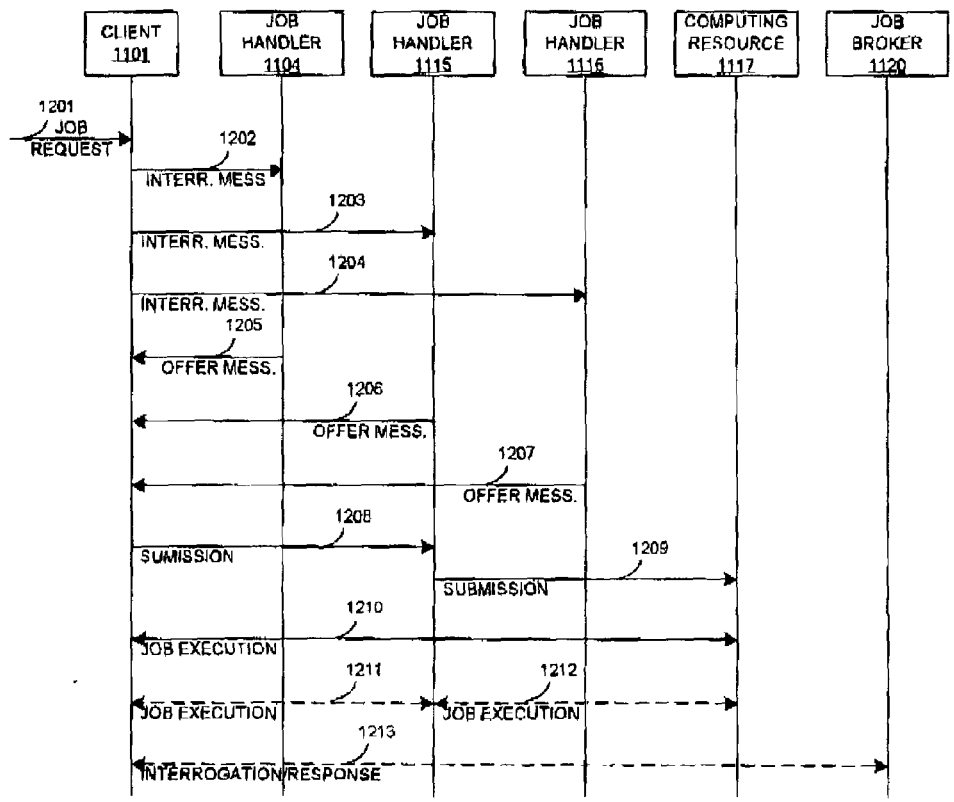
FIG. 12 illustrates a flow of messages between a client, job handlers and a job broker for submitting computing jobs according to another embodiment of the invention.

FIG. 12 illustrates a flow of messages in association with distributing a computing job in the system shown in FIG. 11. FIG. 12 illustrates an exemplary one of the clients assumed to have a computing job for distribution, in the present case client 1101. Further, FIG. 12 illustrates the job handlers 1104, 1115 and 1116. Further, FIG. 12 illustrates an exemplary computing resource 1117 and the job broker 1120.

In a first operation 1201 a job request is received at the client. The job request may be received and processed as outlined with respect to previous embodiments.

The client 1101, based on the job request, possibly including a job profile and a distribution policy, identifies candidate job handlers for handling the computing job. In the present case, it is assumed that the client identifies all three job handlers suitable for handling the computing job.

Therefore, in an operation 1202 an interrogation message is transmitted to the job handler 1104, in an operation 1203 an interrogation message is transmitted to the job handler 1115 and in an operation 1204 an interrogation message is transmitted to the job handler 1116, as outlined before.

Thereafter, in an operation 1205 the job handler 1104 returns an after message to the client 1101, in an operation 1206 the job handler 1115 returns an offer message to the client and in an operation 1207 the job handler 1116 returns an offer message to the client 1101, as outlined before. Based on the offer messages received at the client, the client selects a winning offer and corresponding job handler. In the present case it is assumed that the job handler 1115 is selected as winning job handler according to a selection procedure as outlined before.

Therefore, in an operation 1208 the computing is submitted to the job handler 1115, which in turn, in an operation 1209 selects and instructs the computing resource 1117 with executing the computing job.

Thereafter, in an operation 1210 the computing resource 1117 and the client 1101 directly communicate during the execution of the computing job. Alternatively, as indicated by the dashed arrows 1211 and 1212 the computing resource and the client may communicate via the job handler 1115.

In an alternative the client may submit an interrogation message to the job broker 1120 as indicated by the arrow 1213, e.g. based on a user instruction or automatically, instructing the job broker to identify a suitable job handler. The job broker will then return a response with an indication of a suitable job broker to the client, which in turn can submit the computing job to this job handler.

It is noted that the above flow of messages is an example only and that further scenarios are possible.

According to another embodiment, a client for submitting computing jobs in a distributed computing environment has the following configuration.

1) Client for submitting computing jobs in a distributed computing environment, including
   a code section having instructions adapted to receive a job request including an instruction to execute a computing job;
   a code section having instructions adapted to obtain selection information specifying a job handler for handling the computing job; and
   a code section having instructions adapted to submit the computing job to the selected job handler.

2) Client of 1), wherein the selection information includes configuration information specifying a job distribution policy and including a code section having instructions adapted to select the job handler based on the job distribution policy.

3) Client of 2), wherein the job distribution policy including a code sections specifying for each of a plurality of job handlers at least one of:
   a time period wherein a distribution of a computing job is allowed;
   a group membership required;
   communication characteristics available (incl. security level);
   a network capacity of a network between the respective job handler and the client;
   a prestaging capability (prearranging for execution)
   an availability of data; and
   system characteristics.

4) Client of 2), wherein the job distribution policy includes code sections for specifying for each of a plurality of job handlers the availability of services, the services including at least one of:
   a reporting service;
   a monitoring service (online);
   a steering service; and
   a billing service.

5) Client of 1), including a code section having instructions adapted to obtain a job profile of the computing job and to select the job handler based on the job profile.

6) client of 5), wherein the job profile includes code sections for specifying at least one of;
   a memory capacity;
   a number of processing units required;
   required software licences;
   special resource (e.g. graphic rendering);
   a type of operations to be performed in connection with the computing job;
   a security level required for the computing job;
   a priority of the computing job;
   a cost limit;
   a time limit; and
   a speed requirement.

7) Client of 5), wherein the client including code section of a plurality of predetermined standard job profiles for a plurality of standard job types.

8) Client of 1), including a code section having instructions adapted to transmit an interrogation message to the selected job handler and including a code section having instructions adapted to receive an offer message from the selected job handler indicating whether the job handler can handle the job or not; and including a code section having instructions adapted to transmit the job request to a job broker, if the selected job handler cannot handle the job.

9) Client of 1), including
   a code section having instructions adapted to identify a plurality of job handlers suitable for handling the job based on a job profile and configuration information; and
   a code section having instructions adapted to transmit an interrogation message to the each of the selected job handlers and to receive an offer message from each of the selected job handlers at least indicating whether the job handlers can handle the job or not.

10) Client of 8) or 9), wherein the offer messages indicate execution details on at least one element of the job profile and including a code section having instructions adapted to identify one of the plurality of available job handlers based on the offer messages as winning job handler.

11) Client of 8) or 9), wherein the offer messages indicate execution details on at least one element of the job distribution policy and including a code section having instructions adapted to update the job distribution policy based on the offer messages.

12) Client of 1), including a code section having instructions adapted to identify a plurality of job handlers suitable for handling the computing job and including a code section having instructions adapted to receive a user selection instruction of one of the identified job handlers.
13) Client of 1), including a code section having instructions adapted to forward the job request to a job broker and wherein the job broker is arranged to select a job handler and to inform the client on the selected job handler; and wherein the submission means is arranged to submit the computing job to the selected job handler.
14) Client of 1), wherein the job handler is one of
a control unit of a first computing cluster, the first computing cluster including the client;
a control unit of a second computing cluster, the second computing cluster not including the client;
a processing unit of the first computing cluster associated with the client; and
a job broker associated with the first computing cluster and the second computing cluster.
15) Client of 1), including a code section having instructions adapted to transfer information required for or during execution of the computing job to the job handler.
16) Client of 1), wherein the client is constituted by a thin client including a client processing module and a server processing module, wherein the client processing module is adapted to receive a job request and the server processing module is arranged to perform operations for selecting a job handler.

The invention claimed is:

1. Client for submitting computing jobs in a distributed computing environment, including
an input section within the client for receiving a job request including an instruction to execute a computing job;
a selection section within the client for obtaining selection information specifying a job handler for handling the computing job; and
a submission section within the client for submitting the computing job to the selected job handler, wherein the submission section is configured to:
transmit an interrogation message to the selected job handler,
receive an offer message from the selected job handler indicating whether the job handler can handle the job or not, and
to transmit the job request to a job broker, if the selected job handler cannot handle the job;
wherein a decentralized decision on an appropriate job handler is carried out under control of the client, thereby avoiding a bottle neck of a central job distribution facility.

2. Client of claim 1, wherein the selection information includes configuration information specifying a job distribution policy and wherein the selection section is arranged to select the job handler based on the job distribution policy.

3. Client of claim 2, wherein the job distribution policy specifies for each of a plurality of job handlers at least one of:
a time period wherein a distribution of a computing job is allowed;
a group membership required;
communication characteristics available (incl. security level);
a network capacity of a network between the respective job handler and the client;
a prestaging capability (prearranging for execution)
an availability of data; and
system characteristics.

4. Client of claim 2, wherein the job distribution policy specifies for each of a plurality of job handlers the availability of services, the services including at least one of:
a reporting service;
a monitoring service (online);
a steering service; and
a billing service.

5. Client of claim 1, wherein the selection section is arranged to obtain a job profile of the computing job and to select the job handler based on the job profile.

6. Client of claim 5, wherein the job profile includes at least one of:
a memory capacity;
a number of processing units required;
required software licences;
special resource (e.g. graphic rendering);
a type of operations to be performed in connection with the computing job;
a security level required for the computing job;
a priority of the computing job;
a cost limit;
a time limit; and
a speed requirement.

7. Client of claim 5, wherein the client includes a plurality of predetermined standard job profiles for a plurality of standard job types.

8. Client of claim 1, wherein
the selection section is arranged to identify a plurality of job handlers suitable for handling the job based on the job profile and the configuration information; and
the submission section is arranged to transmit an interrogation message to the each of the selected job handlers and to receive an offer message from each of the selected job handlers at least indicating whether the job handlers can handle the job or not.

9. Client of claim 8, wherein the offer messages indicate execution details on at least one element of the job profile and the selection section is arranged to identify one of the plurality of available job handlers based on the offer messages as winning job handler.

10. Client of claim 8, wherein the offer messages indicate execution details on at least one element of the job distribution policy and wherein the selection section is arranged to update the job distribution policy based on the offer messages.

11. Client of claim 1, wherein the selection section is arranged to identify a plurality of job handlers suitable for handling the computing job and to receive a user selection instruction of one of the identified job handlers.

12. Client of claim 1, wherein the selection unit is arranged to forward the job request to a job broker and wherein the job broker is arranged to select a job handler and to inform the client on the selected job handler; and wherein the submission means is arranged to submit the computing job to the selected job handler.

13. Client of claim 1, wherein the job handler is one of
a control unit of a first computing cluster, the first computing cluster including the client;
a control unit of a second computing cluster, the second computing cluster not including the client;
a processing unit of the first computing cluster associated with the client; and
a job broker associated with the first computing cluster and the second computing cluster.

14. Client of claim 1, wherein the job handler is arranged to instruct a computing resource to execute the computing job.

15. Client of claim 1, wherein the distributed computing environment is constituted by a computing grid including at least one of the group consisting of:
  a plurality of computer clusters;
  at least two computer clusters using different operating systems; and
  a plurality of storage devices.

16. Client of claim 1, wherein the submission section is arranged to transfer information required for or during execution of the computing job to the job handler.

17. Client of claim 1, wherein the job request is one of:
  received from a local source accessed by the client;
  generated using a graphical user interface; and
  generated during execution of a software controlled application.

18. Client of claim 1, wherein the client is constituted by a thin client including a client processing module and a server processing module, wherein the client processing module is adapted to receive a job request and the server processing module is arranged to perform operations for selecting a job handler.

19. Method for submitting computing jobs in a distributed computing environment, including
  receiving a job request including an instruction to execute a computing job at a client;
  obtaining selection information specifying a job handler for handling the computing job at the client;
  transmitting an interrogation message to the selected job handler;
  receiving an offer message from the selected job handler indicating whether the job handler can handle the job or not; and
  if the selected job handler cannot handle the job, transmitting the job request to a job broker; and
  submitting the computing job to the selected job handler by the client;
  wherein a decentralized decision on an appropriate job handler is carried out under control of the client, thereby avoiding a bottle neck of a central job distribution facility.

20. Method of claim 19, including specifying a job distribution policy and selecting the job handler based on the job distribution policy.

21. Method of claim 20, wherein the job distribution policy specifies for each of a plurality of job handlers at least one of:
  a time period wherein a distribution of a computing job is allowed;
  a group membership required;
  communication characteristics available (incl. security level);
  network capacity of a network between the respective job handler and the client;
  prestaging capability (prearranging for execution)
  availability of data;
  system characteristics.

22. Method of claim 20, wherein the job distribution policy specifies for each of a plurality of job handlers the availability of services, the services including at least one of:
  a reporting service;
  a monitoring service (online);
  a steering service; and
  a billing service.

23. Method of claim 19, including obtaining a job profile of the computing job and to select the job handler based on the job profile.

24. Method of claim 23, wherein the job profile includes at least one of:
  a memory capacity;
  a number of processing units required;
  required software licences;
  special resource (e.g. graphic rendering);
  a type of operations to be performed in connection with the computing job;
  a security level required for the computing job;
  a priority of the computing job;
  a cost limit;
  a time limit; and
  a speed requirement.

25. Method of claim 23, including a plurality of predetermined standard job profiles for a plurality of standard job types.

26. Method of claim 19, including
  identifying a plurality of job handlers suitable for handling the job based on the job profile and the configuration information; and
  transmitting an interrogation message to the each of the selected job handlers; and
  receiving an offer message from each of the selected job handlers at least indicating whether the job handlers can handle the job or not.

27. Method of claim 26, wherein the offer messages indicate execution details on at least one element of the job profile and including identifying one of the plurality of available job handlers based on the offer messages as winning job handler.

28. Method of claim 26, wherein the offer messages indicate execution details on at least one element of the job distribution policy and including updating the job distribution policy based on the offer message.

29. Method of claim 19, including identifying a plurality of job handlers suitable for handling the computing job and to receive a user selection instruction of one of the identified job handlers.

30. Method of claim 19, including forwarding the job request to a job broker and wherein the job broker selects a job handler and informs the client on the selected job handler; and including submitting the computing job to the selected job handler.

31. Method of claim 19, wherein the job handler is one of
  a control unit of a first computing cluster, the first computing cluster including the client;
  a control unit of a second computing cluster, the second computing cluster not including the client;
  a processing unit of the first computing cluster associated with the client; and
  a job broker associated with the first computing cluster and the second computing cluster.

32. Method of claim 19, wherein the job handler instructs a computing resource to execute the computing job.

33. Method of claim 19, wherein the distributed computing environment is constituted by a computing grid including at least one of the group consisting of:
  a plurality of computer clusters;
  at least two computer clusters using different operating systems; and
  a plurality of storage devices.

34. Method of claim 19, including transferring information required for or during execution of the computing job to the job handler.

35. Method of claim 19, wherein the job request is one of
received from a local source accessed by the client;
generated using a graphical user interface; and
generated during execution of a software controlled application.

36. Method of claim 19, wherein the client is constituted by a thin client including a client processing module and a server processing module, wherein the client processing module receives a job request the server processing module performs operations for selecting a job handler.

37. System including a plurality of computing devices for handling computing jobs, including a plurality of clients according to claim 1.

* * * * *